US012675725B2

(12) United States Patent
Baum et al.

(10) Patent No.: US 12,675,725 B2
(45) Date of Patent: Jul. 7, 2026

(54) ERROR ROBUST QUANTUM COMPILER

(71) Applicant: Q-Ctrl Pty Ltd, Sydney (AU)

(72) Inventors: Yuval Baum, Sydney (AU); Pranav Santosh Mundada, Sydney (AU); Aaron Barbosa, Sydney (AU); Michael Robert Hush, Sydney (AU); Andre Carvalho, Sydney (AU); Michael Biercuk, Sydney (AU)

(73) Assignee: Q-Ctrl Pty Ltd, Sydney (AU)

( * ) Notice: Subject to any disclaimer, the term of this patent is extended or adjusted under 35 U.S.C. 154(b) by 0 days.

(21) Appl. No.: 19/236,332

(22) Filed: Jun. 12, 2025

(65) Prior Publication Data

US 2026/0087399 A1      Mar. 26, 2026

Related U.S. Application Data

(63) Continuation of application No. 18/882,369, filed as application No. PCT/AU2023/050134 on Feb. 28, 2023, now abandoned.

(30) Foreign Application Priority Data

Mar. 11, 2022      (AU) ................................ 2022900597

(51) Int. Cl.
| | |
|---|---|
| *G06F 11/00* | (2006.01) |
| *G06N 10/70* | (2022.01) |
| *G06F 11/07* | (2006.01) |

(52) U.S. Cl.
CPC .......... *G06N 10/70* (2022.01); *G06F 11/0751* (2013.01); *G06F 11/079* (2013.01); *G06F 11/0793* (2013.01)

(58) Field of Classification Search
CPC .... G06N 10/70; G06F 11/079; G06F 11/0751
See application file for complete search history.

(56) References Cited

U.S. PATENT DOCUMENTS

| | | | |
|---|---|---|---|
| 11,194,642 B2 * | 12/2021 | Javadiabhari | ....... G06F 11/0721 |
| 12,147,874 B2 * | 11/2024 | Barber | .................. G06N 10/70 |

(Continued)

FOREIGN PATENT DOCUMENTS

WO      WO-2023168480 A1      9/2023

OTHER PUBLICATIONS

"Australian Application No. 2022900597, International-type search for provisional patent application dated Oct. 24, 2022", (Oct. 24, 2022), 21 pgs.

(Continued)

*Primary Examiner* — Jonathan D Gibson
(74) *Attorney, Agent, or Firm* — Schwegman Lundberg & Woessner, P.A.

(57) ABSTRACT

Provided herein are methods for generating, from a quantum algorithm, a quantum circuit that is error robust. The methods determine a characteristic of a quantum hardware that is used to implement the quantum algorithm and informs the deterministic dynamic error suppression routine to be implemented. The methods also consider the compiled quantum circuit because that provides the information about the context of the operations performed on the qubits, which is an important factor in the fidelity of the quantum gates and ultimately the success of the algorithm. The methods then use the characteristic and the context to apply deterministic error correction.

18 Claims, 14 Drawing Sheets

(56) References Cited

U.S. PATENT DOCUMENTS

| | | | | |
|---|---|---|---|---|
| 12,462,181 | B2 * | 11/2025 | Coady | G06N 10/70 |
| 2020/0174879 | A1 * | 6/2020 | Javadiabhari | G06F 11/0721 |
| 2020/0394101 | A1 * | 12/2020 | Kerman | G06N 10/70 |
| 2022/0383179 | A1 * | 12/2022 | Maksymov | G06N 10/60 |
| 2023/0168956 | A1 * | 6/2023 | Griffin | G06N 10/70 |
| | | | | 714/47.3 |
| 2024/0394585 | A1 * | 11/2024 | Reagor | G06N 10/70 |
| 2025/0068958 | A1 * | 2/2025 | Sankar | G06N 10/70 |
| 2025/0165843 | A1 * | 5/2025 | Thompson | G06F 11/004 |
| 2025/0238703 | A1 * | 7/2025 | Kim | G06N 10/70 |
| 2025/0384327 | A1 * | 12/2025 | Fowler | G06N 10/70 |

OTHER PUBLICATIONS

"International Application No. PCT/Au2023/050134, International Search Report and Written Opinion mailed Apr. 18, 2023", (Apr. 18, 2023), 11 pgs.

Ahsan, Muhammad, et al., "Quantum Circuit Engineering for Correcting Coherent Noise", Physical Review A, vol. 105, No. 2, (Sep. 8, 2021), 13 pgs.

Baum, Yuval, et al., "Experimental Deep Reinforcement Learning for Error-Robust Gate-Set Design on a Superconducting Quantum Computer", PRX Quantum 2, 040324 (2021), (Nov. 4, 2021), 12 pgs.

Lienhard, Benjamin, et al., "Deep Neural Network Discrimination of Multiplexed Superconducting Qubit States", arXiv preprint, published Jun. 18, 2021, (Jun. 21, 2021), 18 pgs.

Murali, Prakash, et al., "Full-Stack, Real-System Quantum Computer Studies: Architectural Comparisons and Design Insights", 2019 ACM/IEEE 46th Annual International Symposium on Computer Architecture (ISCA), 2019., (Jun. 11, 2019), 14 pgs.

Murali, Prakash, et al., "Software Mitigation of Crosstalk on Noisy Intermediate-Scale Quantum Computers", Proceedings of Proceedings of the Twenty-Fifth International Conference on Architectural Support for Programming Languages and Operating Systems, Lausanne, Switzerland, Mar. 16-20, 2020 (ASPLOS '20), 16 pages. https://doi.org/10.1145/3373376.3378477, (2020), 16 pgs.

Nguyen, T., et al., "Quantum Circuit Transformations with a Multi-Level Intermediate Representation Compiler", arXiv:2112.10677 [quant-ph], (Dec. 20, 2021), 9 pgs.

Nishio, Shin, et al., "Extracting Success from IBM's 20-Qubit Machines Using Error-Aware Compilation", ACM Journal on Emerging Technologies in Computing Systems (JETC), vol. 16, No. 3, 2020, (Mar. 26, 2019), 15 pgs.

Svore, Krysta M., et al., "A Layered Software Architecture for Quantum Computing Design Tools", Computer, vol. 39, No. 1, 2006, (Jan. 2006), 74-83.

* cited by examiner

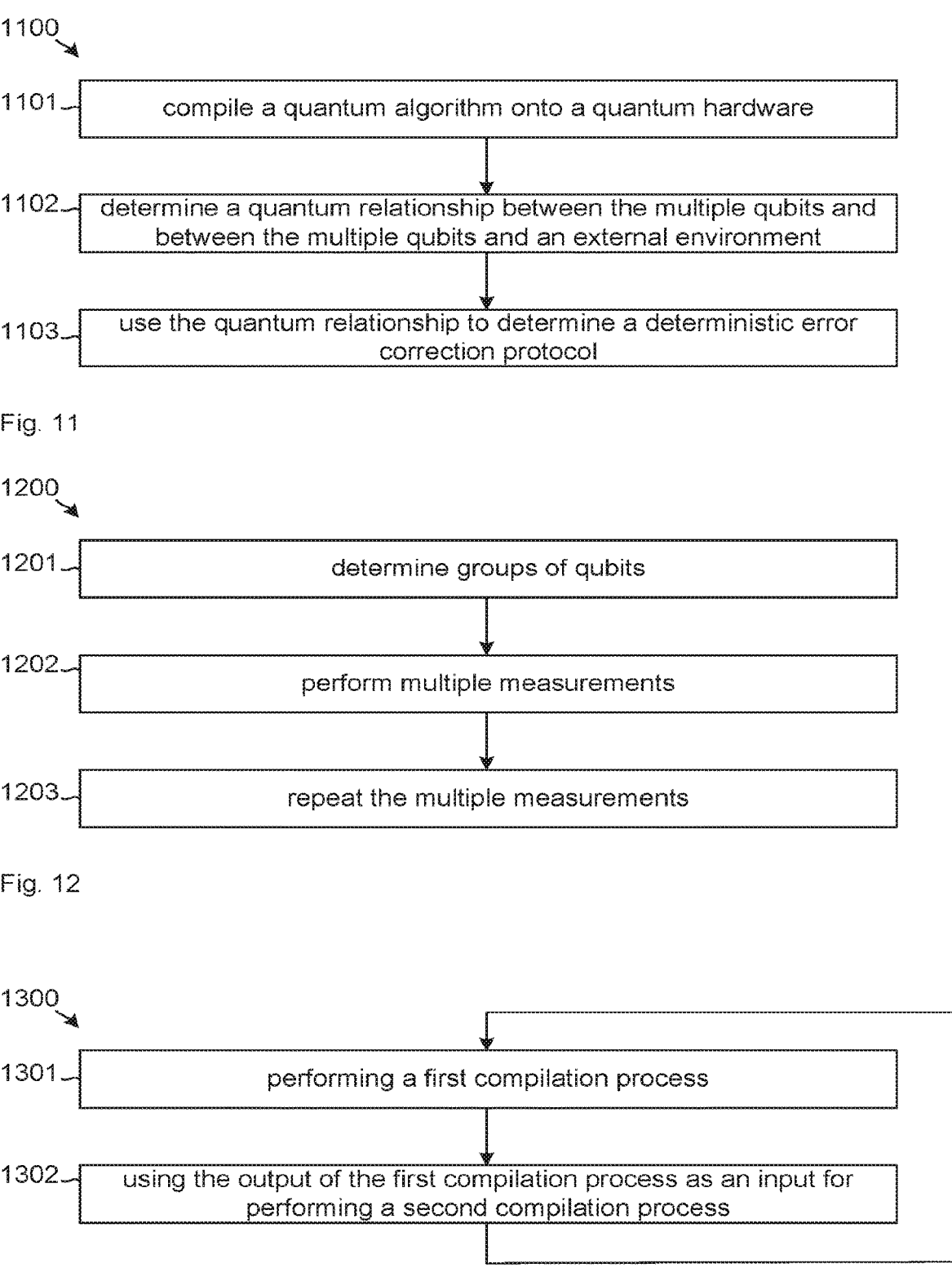

1100

1101 — compile a quantum algorithm onto a quantum hardware

1102 — determine a quantum relationship between the multiple qubits and between the multiple qubits and an external environment 1103 — use the quantum relationship to determine a deterministic error correction protocol

1201 — determine groups of qubits

1202 — perform multiple measurements

1203 — repeat the multiple measurements

1301 — performing a first compilation process

1302 — using the output of the first compilation process as an input for performing a second compilation process

| | |
|---|---|
| 1401 | dividing qubits of the quantum hardware into groups |
| 1402 | dividing the qubits into blocks based on a quantum circuit |
| 1403 | applying driven single-qubit operations |
| 1404 | determining a time shift of the driven single-qubit operations |

1500

| | |
|---|---|
| 1501 | receiving a compiled circuit |
| 1502 | replacing quantum logic gates |
| 1503 | outputting a definition of the circuit |

1600

1601 — receiving measurement results

1602 — using an approximated confusion matrix from an error characterisation to contract a tensor 1603 — converting the tensor to a probability distribution 1604 — correcting the errors in the quantum measurements 1605 — outputting a measurement-error-corrected result

1700

1701    1702

1704

1703

ERROR ROBUST QUANTUM COMPILER

CROSS-REFERENCE TO RELATED APPLICATIONS

This application is a continuation of U.S. application Ser. No. 18/882,369, filed on Sep. 11, 2024, which is a U.S. National Stage Filing under 35 U.S.C. § 371 from International Application No. PCT/AU2023/050134, filed on 28 Feb. 2023, and published as WO2023/168480 on 14 Sep. 2023, which claims the benefit of priority from Australian Provisional Patent Application 2022900597 filed on 11 Mar. 2022, the benefit of priority of each of which is claimed herein, and which applications and publication are incorporated herein by reference in their entireties.

TECHNICAL FIELD

This disclose relates to compiling a quantum algorithm onto a quantum hardware using error correction.

BACKGROUND

Quantum computers offer immense opportunities for solving problems that are intractable by existing classical hardware based on binary bits. Quantum computers use quantum bits ("qubits"), which can hold a superposition of states and can be entangled.

However, one major roadblock in the path to widespread use of quantum computers is that the qubits are relatively unstable, which means their quantum state is lost too quickly for most practical computations. Quantum error correction codes, such as the surface code, consume additional resources to provide protection against errors, and use more qubits than are currently available making them difficult to implement.

Dynamic error suppression is another approach to stabilise the quantum state on a qubit. This involves individual operations that effectively correct errors without requiring additional qubits. It may be called dynamic decoupling when referring to idling qubits (memory), or dynamically corrected gates when applied to the active manipulation of one or more qubits. Dynamic error suppression is deterministic in that it does not require additional resources such as multiple measurement runs which must be combined in order to gain a benefit. While dynamic error suppression can be performed successfully on a single qubit, or an isolated pair of qubits it is difficult to apply dynamic error suppression on an entire quantum circuit having multiple qubits that implement a quantum algorithm.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Provided herein are methods for generating, from a quantum algorithm, a quantum circuit that is error robust. The methods determine a characteristic of a quantum hardware that is used to implement the quantum algorithm and informs the deterministic dynamic error suppression routine to be implemented. The methods also consider the compiled quantum circuit because that provides the information about the context of the operations performed on the qubits, which is an important factor in the fidelity of the quantum gates and ultimately the success of the algorithm. The methods then use the characteristic and the context to apply deterministic error correction.

A method for generating an error-corrected quantum circuit comprises:

compiling a quantum algorithm onto a quantum hardware using multiple qubits to generate a quantum circuit;

determining a quantum relationship between the multiple qubits and between the multiple qubits and an external environment as a result of implementing the quantum circuit on the quantum hardware; and using the quantum relationship between the multiple qubits and between the multiple qubits and an external environment to determine a deterministic error correction protocol, specific to the quantum circuit and specific to the quantum hardware, for each of the multiple qubits and for interactions between the multiple qubits.

In some embodiments, the method further comprises performing multiple measurements on qubits of the quantum hardware to determine an error characterisation of the quantum hardware based on a topology of the quantum hardware.

In some embodiments, the error characterisation comprising one or more of individual gate errors, decoherence processes, measurement errors, and cross-talk between qubits based on a topology of the quantum hardware.

In some embodiments, compiling comprises, for each of the multiple logical quantum operations in the quantum algorithm, selecting one or more quantum blocks to realise the quantum algorithm on the quantum hardware, wherein each of the quantum blocks realises the logical function of that logical quantum operation.

In some embodiments, the method further comprises determining an error correction protocol for each of the quantum blocks, the error correction protocol comprising error correction against errors identified in an error characterisation and being specific for selected one or more quantum blocks to realise the quantum algorithm.

In some embodiments, the method further comprises executing the quantum algorithm on the quantum hardware using selected quantum blocks and the deterministic error correction protocol to obtain qubit measurements.

In some embodiments, the method further comprises reducing measurement errors in the qubit measurements by applying an error reduction operation that is based on the error characterisation.

A method for characterising errors in quantum hardware comprising multiple qubits comprises determining groups of qubits to minimize inter-group correlations based on a topology of the quantum hardware; performing multiple measurements to approximate a confusion matrix for individual qubit readouts; and repeating the multiple measurements for the qubit groups to determine the error characterisation of the hardware.

In some embodiments, the groups of qubits includes qubit pairs with low cross-coupling between pairs.

In some embodiments, the error characterisation comprises one or more of individual gate fidelities, noise spectra, and crosstalk strengths.

In some embodiments, the method further comprises using machine learning to automate the determining of the error characterisation.

In some embodiments, the method further comprises optimizing parameters of quantum gates using the qubits to maximise fidelity of the quantum gates.

In some embodiments, fidelity is maximized for gates with qubits in the groups in parallel.

A method for compiling a quantum algorithm onto a quantum hardware having a native gate set comprises repeatedly performing the steps of:

performing a first compilation process to map the quantum algorithm onto the quantum hardware and the native gate set; and using the output of the first compilation process as an input for performing a second compilation process, different from the first compilation process, to maximize the use of low-error qubits as identified by an error characterisation process.

A method for quantum error correction of a quantum hardware comprises:

dividing qubits of the quantum hardware into groups based on a topology of the quantum hardware;

dividing the qubits into blocks based on a quantum circuit compiled onto the quantum hardware;

applying driven single-qubit operations to correct quantum errors arising during identity operations dependent on the quantum circuit compiled onto the quantum hardware; and determining a time shift of the driven single-qubit operations to correct cross coupling for each of the groups during identity operations and the blocks and suppress decoherence.

In some embodiments, the method further comprises redefining non-identity operations to correct for error processes identified through error characterisation through time-domain modulation of the control signals used to implement the non-identity operations.

In some embodiments, the method further comprises modulating control signals in multiple qubits in time in a continuous or discontinuous manner.

In some embodiments, the method further comprises assembling the blocks from a library of error-corrected quantum gates based on an error characterisation.

A method for error-correcting compilation to correct error sources identified in an error characterisation process comprises:

receiving a compiled circuit compatible with a hardware device topology and gate set;

replacing quantum logic gates in the compiled circuit having uncorrected errors over an acceptable threshold with error-corrected alternatives, derived using the error characterisation process; and outputting a definition of the circuit with all replacement gate definitions in a format for hardware execution, including identity and non-identity operations.

In some embodiments, the method further comprises:

identifying error-prone non-identity gates;

replacing error-prone non-identity gates with auto-calibrated gates;

replacing identity gates in the compiled quantum circuit with error-corrected identity gates including an error correction protocol;

assembling the output error-robust circuit comprising the auto-calibrated gates and the error-corrected identity gates into a circuit representation for execution on the quantum hardware.

A method for correcting errors in quantum measurements of a quantum circuit on a quantum hardware comprises:

receiving measurement results;

using an approximated confusion matrix from an error characterisation to contract a tensor based on the groups of qubits;

converting the tensor to a probability distribution; and correcting the errors in the quantum measurements as indicated by the probability distribution; and outputting a measurement-error-corrected result.

In some embodiments, the method further comprises dividing the quantum circuit into groups of qubits to minimize inter-group correlations based on a topology of the quantum hardware; and permuting an ordering of the tensor based on the groups of qubits.

In some embodiments, the method further comprises adding dimensions to the tensor for unmeasured qubits.

In some embodiments, the method further comprises applying a neural network to the measurements to restore correlations neglected by the tensored mitigation, based on an error characterisation.

An internet server is configured to:

offer a web-interface, the web interface comprising input elements to input a quantum algorithm and a characterisation of a quantum hardware;

receive the quantum algorithm and the incomplete description of the quantum hardware through the web-interface;

perform error characterisation or retrieve an error characterisation previously performed for the target quantum hardware;

generate a decorated quantum circuit description that realises the quantum algorithm on the quantum hardware, wherein the decorated quantum circuit description comprises quantum logic blocks that are error corrected based on the characterisation;

output the quantum circuit description; and receive and analyse the raw output data from the quantum hardware using the complete characterisation.

In some embodiments, outputting the quantum circuit description comprises sending the decorated quantum circuit description to the user through the web-interface; or sending the decorated quantum circuit description to the quantum hardware for execution on the quantum hardware.

In some embodiments, receiving and analysing the raw output data comprises receiving the raw output data from the user through the web-interface for analysis; or receiving the raw output data from the quantum hardware for analysis.

Optional features provided above with reference to one of the methods or the internet server are equally optional features of the other methods and the internet server.

BRIEF DESCRIPTION OF DRAWINGS

FIG. 11 illustrates a method for generating an error-corrected quantum circuit.

FIG. 12 illustrates a method for characterising errors in quantum hardware comprising multiple qubits.

FIG. 13 illustrates a method for compiling a quantum algorithm onto a quantum hardware having a native gate set.

DESCRIPTION OF EMBODIMENTS

Figure 1:
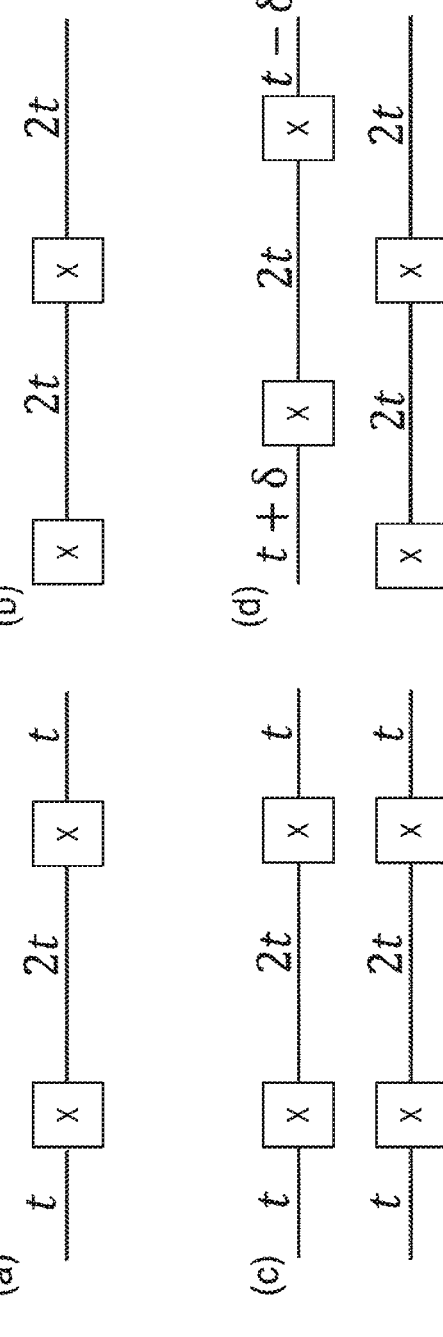
FIG. 1 illustrates dynamic decoupling (DD) motifs. (a, b) Show two motifs realizing a single qubit DD. As long as the idling time between the two bit flips is equal to the remaining idling time, the effect of phase scrambling is suppressed. (c) Since each bit flip reverse the ZZ effect, the simultaneous application of two flips leave the ZZ coupling unchanged. Therefore, while the motif in (c) suppresses $T_2$ effects on both qubits, it does not mitigate the ZZ effect. (d) Combining the two motifs in (a) and (b) leads to ZZ mitigation. Since X gates (bit flips) are not instantaneous, an asymmetry parameter, $\delta$, can be optimize to achieve the best ZZ cancellation.

As mentioned above, the methods disclosed herein relate to quantum algorithms implemented by multiple qubits on a specific quantum hardware. Unlike classical digital computers, where the electronic characteristics are abstracted to stable binary bit values, quantum hardware does not provide this level of abstraction without incurring impractical inaccuracies. This means that each quantum hardware has significantly different characteristics with regards to the qubits. In particular, the relationship between qubits as well as the relationship between the qubits and the environment is different for every different quantum hardware and even for each circuit run on that hardware. As a result, hardware-agnostic error correction leads to unsatisfactory results. Further, error correction that does not take into account the compiled circuit structure, leads to high error rates.

Dynamic error suppression can be used to stabilise individual qubits or improve the fidelity of an isolated quantum logic gate between a pair of qubits. One example protocol involves the stabilisation of a qubit during an idle time period—this is known as dynamic decoupling. During this period, additional rotations can be applied to the qubit state to cancel out an accumulated error. In a multi-qubit quantum circuit, however, the idle times of the multiple qubits are not the same and the qubits also interact with each other. Therefore, it is difficult to apply individual dynamic decoupling and error correction depends on hardware characteristics as well as the compiled circuit.

Compilation in this context means the mapping of a quantum algorithm onto a quantum hardware, taking into account the physical operations available and connectivity between different qubits. Such quantum hardware often has a native gate set that may be specific for that quantum hardware, so the compiled quantum circuit uses the available gate set, noting that additional gates may be introduced. Compiling may also involve the optimization of the quantum circuit to reduce the number of gates, for example, via exploitation of mathematical relationships between the gates.

Similar to an algorithm on a classical computer, a quantum algorithm is a step-by-step procedure, where each of the steps can be performed on a quantum computer. Each step is an operation on a quantum state in the algorithm. During compilation, these steps are mapped to qubit operations, which are referred to as gates. Examples of quantum algorithms include Shor's algorithm, the Variational Quantum Eigensolver, Grover's algorithm, and even Quantum Error Correction, but many other quantum algorithms can be implemented using the method disclosed herein. It is noted that the methods disclosed herein are applicable to a wide range of different qubit types, including nitrogen vacancies, trapped ions, silicon qubits, superconducting qubits, and many others.

It is also noted that the methods disclosed herein are performed by a classical computer. That is, a classical, digital processor, executing software, performs compilation, processes error measurements, optimizes and selects gates, determines error correction protocols, and processes output measurements, etc.

The usefulness of a quantum computer is ultimately determined by its ability to successfully implement meaningful quantum algorithms. An ideal implementation of a quantum algorithm is not possible on current quantum hardware, however, being able to run algorithms with high success probability may provide a route to quantum advantage in the near future. The quality of a quantum algorithm is affected not only by the quality of the individual building blocks, e.g., the quality of qubits, gates and measurements, but also by global device and algorithm properties such as device topology, multi-qubit correlations and algorithmic structures. This disclosure provides an automated method for the optimization of the different components that eventually affect the quality of the algorithm implementation on a given quantum hardware and the incorporation of deterministic error suppression techniques. The disclosed methods lead to an improvement across different algorithms and quantum devices.

Overview of Invention

The disclosed protocol is a procedure for enhancing the performance of quantum algorithms on quantum hardware based on deterministic error correction methods. Once the user provides a quantum circuit, through a website or an application programming interface (API), the disclosed protocol preforms a series of optimization and error correction steps and outputs the measured results of the quantum algorithm.

The workflow of the protocol is as follows—

Accept a circuit—Given a quantum circuit, first it is converted into a suitable intermediate representation. This enables robust and hardware-agnostic compilation procedures.

Front end compilation—A sequence of compiler passes is used to reduce the depth (gate count) of the quantum circuit.

Hardware-specific back-end compilation—The logical operations in the circuit are mapped to the native gates available on the hardware. Additional hardware-specific compilation passes are executed to account for device topology, gate errors, parallel gate crosstalk, etc.

Idling and crosstalk-error reduction by DD decoration—Dynamical decoupling (DD) sequences are incorporated to mitigate various idling errors including dephasing and ZZ crosstalk at the algorithmic level, depending on the characteristics of the device and the circuit returned by the compilers. This disclosure relates to how to automatically incorporate the best DD sequence into an algorithm for execution, rather than specific sequence design.

Gate-error reduction by system-wide AI-driven auto-calibration—AI-powered optimizers are used to perform pulse-level gate calibration throughout the quantum computer, including optimizing multiple gates in parallel. These optimal pulses are used to perform higher fidelity gates used in the circuit. There is an advantage in the manner and method of using AI to perform system-wide calibration and automation of gate optimization. The process can be automated in advance of user interaction. In one example, all relevant error-prone gates are replaced by these optimized gates.

Execute algorithm on the quantum hardware. The final definition of the circuit is output in a format compatible with hardware execution. This may be accomplished by returning the "new" commands to the user for execution, or via direct connection to a hardware backend (locally or in the cloud).

Measurement-error reduction by efficient AI-enhanced readout-error mitigation—The measured probability distribution from the execution of the algorithm on a quantum device contains measurement errors. These errors are corrected in post-processing using an efficient AI-enhanced measurement-error-mitigation protocol. This disclosure provide an approach as part of the overall workflow which suppresses errors efficiently.

Return solution with augmented likelihood of algorithmic success—The "answer" from the quantum algorithm's execution is returned with an augmented confidence level of success.

These processes may be integrated into a hardware system locally or connected to a cloud-accessible machine via an API. The user need not incur any direct overhead—a single pass through the toolchain delivers maximum performance. This is an advantage relative to other known approaches to circuit level error suppression.

These approaches may be used for either direct algorithmic execution or for improving the performance of quantum error correction (QEC). QEC augmented with deterministic circuit-level error suppression through this protocol is an advantage. In addition, improving the performance of quantum algorithms without the need for full quantum error correction is another advantage.

These approaches are relevant to any quantum computing architecture, and are not specific to a single qubit type.

Background on Noise and Error Processes

Quantum systems are subjected to various types of noise. These noise processes affect the building blocks of quantum circuits, such as gates and measurements. These operations may be optimized in order to reduce the effect of noise and imperfections. However, standard gate calibration techniques typically keep spectator (non-participating) qubits in the ground state. When applying an algorithm, a more complex context-dependent noise process can arise, resulting in different type of error.

Single-Qubit Decoherence

During a multi-qubit algorithm, at any given moment, some qubits are idle. Even in the presence of perfect gates and measurements, for wide and deep circuits, idling errors alone can fully randomize the quantum circuit rendering any quantum algorithm useless.

The quantum state of a single qubit can be represented by a complex superposition of its internal states, $A|0\rangle+B\exp\{i\phi\}|1\rangle$ with $A^2+B^2\leq1$. While quantum gates intentionally steer quantum states towards a desired target, quantum noise and unwanted couplings may steer quantum states as well. For example, noise processes may arise due to energy loss to the environment, in which a qubit state $|1\rangle$ decays to $|0\rangle$. This process is characterized by a typical time scale known as $T_1$. This type of error can be mitigated only by reducing the total circuit duration. Yet, as hardware quality improves, $T_1$ times become longer and for mid-scale algorithms this process is, typically, not the bottleneck.

Another noise process is phase dephasing. In this process, the phase $\phi$ scrambles and the quantum state loses its phase information. This process is characterized by a typical time scale known as $T_2$. In the presence of nearby drives, $T_2$ may be much shorter than $T_1$, dominating the overall algorithm performance.

Crosstalk

While the two processes above arise due to coupling between the system and the environment, idling errors may also arise due to unwanted coupling between nearby qubits. The most common idling error due to unwanted couplings known as the ZZ-error. In this process, a qubit acquires an unwanted phase which depends both on its state and a nearby qubit's state. This unwanted coupling exists between pairs of coupled qubits and it has a constant static part, which only depends on systems' parameters, and a dynamical part which depends on the drives we apply during the circuit.

Gate Errors

Universal quantum computing can be achieved with arbitrary single-qubit gate and a two-qubit entangling gate. Both single-qubit and two-qubit gates are typically realized by irradiating the qubits with shaped wave-packets (pulses). On top of $T_1$ and $T_2$ errors as mention above, gates are prone to other types of errors as well. Gate implementation is characterized by its pulse parameters. The ideal gate implementation has specific ideal pulse parameter and any deviation of these parameters, known as over rotations, detunings, or other types lead to lower performance. Such deviations arise due to an unsuccessful calibration (optimization) process, extrinsic time-varying noise, or drift in system parameters. Another type of errors are control errors, pulses' parameters can deviate due to the non-linear transfer function of the control chain and amplitude/phase noise in the pulse generators. These deviations lead to coherent gate errors similar to over rotations. Qubit decoherence further degrades the gate fidelity. While dephasing errors can often be mitigated by optimal pulse-shaping, the errors due to qubit relaxation can only be reduced with faster gates. However, fast gates are prone to another type of error known as leakage, where the system is excited to states outside the computational space which reduces the circuit fidelity.

Measurement and Readout Errors

Measuring qubits projects them to the eigenvalues of the observable. Typically it results in projecting the qubit to either the ground or excited state and ideally the repeated measurements of the same observable should give identical results. Measurement errors occur due to noise in the readout chain, qubit back-action, qubit relaxation and correlations between the multi-qubit measurements. Errors in measurement lead to large overheads for quantum error correction.

Overview of Device Aware Algorithmic Dynamic Decoupling

Dynamical decoupling (DD) is an open-loop quantum control technique aimed to suppress errors on idling qubits. In its simplest form, DD is implemented by periodic sequences of control pulses (gates), whose net effect is to approximately cancel the unwanted couplings. Most DD protocols are designed to fight this $T_2$ process, but different schemes exist for designing DD protocols for specific error-reducing tasks. For instance, a ZZ error can be mitigated by a DD protocol. Yet, protocols that mitigate ZZ errors can change dramatically from one algorithm to another and from one device to another, depending on the device topology, connectivity and ability to parallelize the different layers of the algorithm. There is a substantial body of literature on different approaches to designing DD sequences for different physical settings.

This disclosure provides methods for designing a protocol that can be both efficiently automated, aware of hardware and circuit context, and be applicable for generic algorithms and a wide range of quantum hardware. The ability to construct a well designed protocol for a given algorithm can render it useful.

Automated DD Scheme

Basic DD Motif

Figure 2:
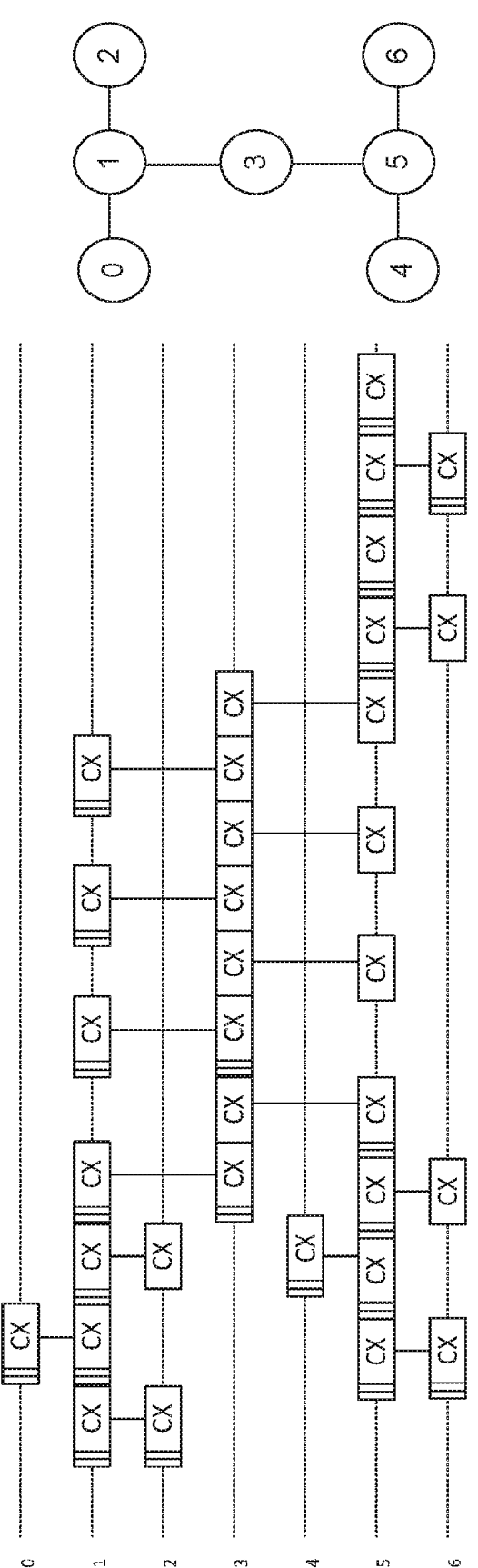
FIG. 2 illustrates an example of a compiled circuit. On the left, a snapshot of a 7-qubit algorithm, already compiled to the native gates available on this device. The disclosed method gets as an input the compiled circuit and the device connectivity, as appears on the right, and returns a decorated circuit with the optimal DD embedded in it.

The disclosed automated scheme gets as an input a quantum circuit and device topology (FIG. 2), and returns a new circuit in which an optimal DD protocol is embedded in the original circuit.

The guiding principle of DD is the replacement of idling periods with an identity operation composed of one or more qubit manipulations which give no net change to the qubit state. Such examples appear in FIG. 1(a, b). In these examples, the idling period is replaced by two applications of X gates (bit flip). Two consecutive bit flips are equivalent to no operation at all. Yet, each application of an X gate reverse the direction of the $T_2$ related (stochastic) phase diffusion. Therefore, by matching the idling time between the two bit flips to the remaining idling time, the effect of $T_2$ errors is suppressed (statistically cancels out). The statistical cancellation improves as the intermediate idling time, t, becomes smaller. Thus, if the total idling time is long, it may be beneficial to replace it with several repetitions of the basic motif. Since the application of X gates is not ideal, there is an optimal number of such repetitions. This number depends of the quality of the qubits ($T_2$ time and X gate error) and the strength of the ZZ coupling.

For a pair of coupled qubits, a ZZ idling error exists on top of the $T_2$ error. Individual bit flip reverses the direction of the ZZ coupling. Hence, a simultaneous application of bit flips, as depicted in FIG. 1(c), leaves the ZZ coupling unchanged. In order to include ZZ mitigation, the two DD schemes must have a relative shift. Since the application of X gates is not instantaneous, an asymmetry parameter, δ, can be optimized in order to achieve optimal ZZ cancellation. This motif, as appears in FIG. 1(d), is the basic building block of our method. More complicated motifs can be derived for cases where more than two qubits are all mutually coupled, and alternate couplings (such as XX) can be cancelled using sequences of different operations.

Including the basic motif for a set of fully idle qubits is a relatively easy task which only requires finding the optimal δ parameter and the optimal number of motif repetitions. However, finding the optimal embedding of this motif in an arbitrary algorithm (FIG. 2) has no clear solution.

Automated Embedding DD Motifs in an Arbitrary Circuit

In this part the disclosure provides details on the automated scheme for embedding the DD motif in a generic circuit. The method is designed to cancel as much as possible the $T_2$ and ZZ errors (typically, full cancellation is not possible) while keeping the number of X gates as low as possible. Extremely dense DD schemes (comprising many operations in a short time period) may be more harmful than useful, due to the individual errors of each X gates and due to heating effects.

Figure 3:
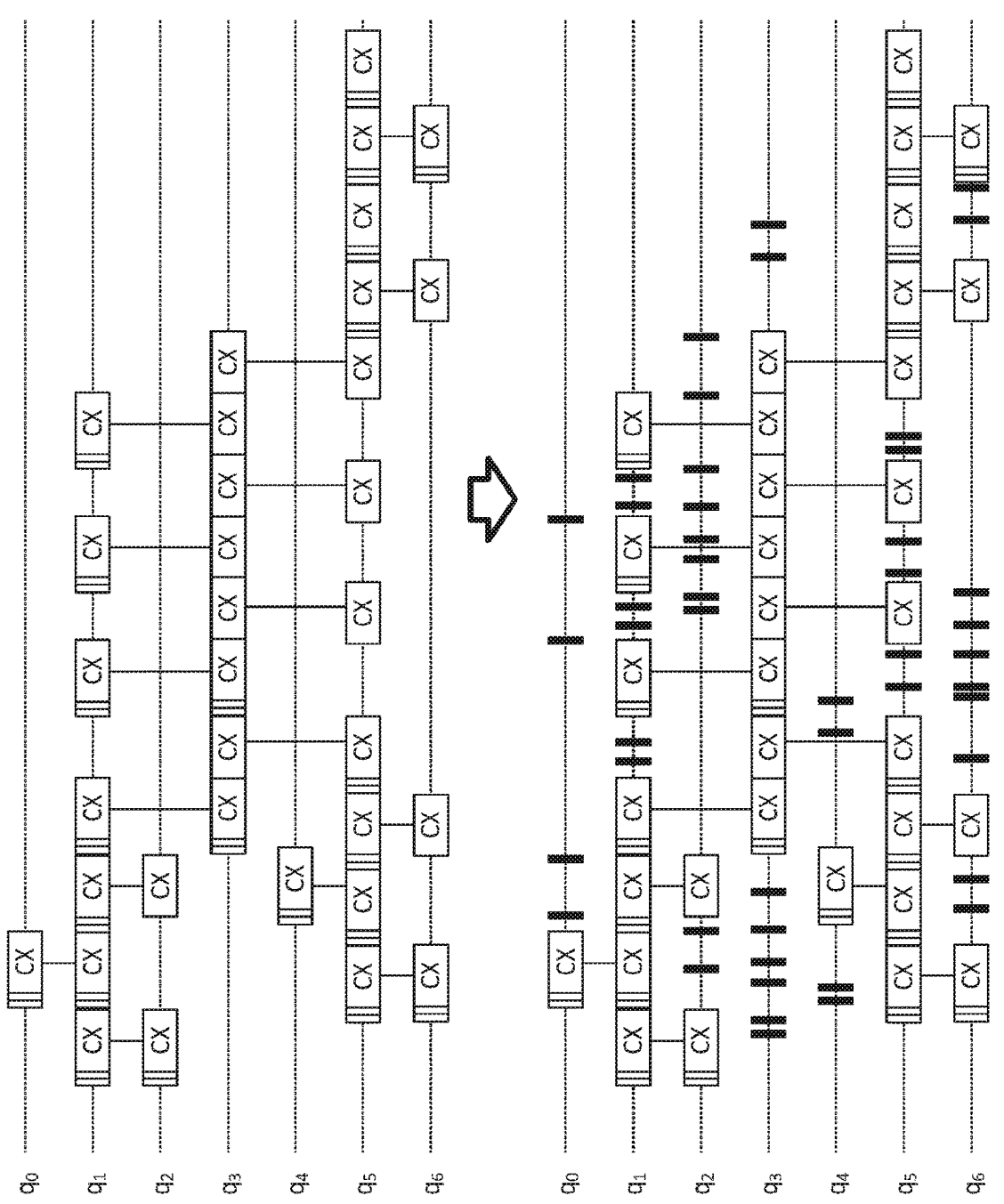
FIG. 3 provides an example of the DD embedding. The input circuit, on the top, is a compiled circuit and the output circuit of the disclosed automated scheme, on the bottom, in the original circuit with the optimal DD structure embedded in it. The embedded DD structure comprises X operations at specific times as calculated by the error correction protocol specific for the input circuit and the quantum hardware. It is noted that this figure has been simplified for illustration purposes, which means the temporal (horizontal) location of the DD operations may not be accurate.

FIG. 3 illustrates an example with the input circuit on top and the compiled circuit with embedded DD at the bottom.

The automated protocol is as follows:

1. Given a device topology, the protocol divides the qubits to N groups by solving a graph coloring problem. For most hardware providers N=2, meaning, all qubits belong to one out of two possible groups. Qubits in one group will experience a δ-shifted DD while qubits on the other group will experience a non-shifted 2t-2t DD structure. See FIG. 1(d) for the distinction between the two groups.

2. Given a compiled circuit, the protocol slices the circuit to non-overlapping 'Global Blocks' which cover the full circuit. A block is a maximal time period where the set of idle qubits remains unchanged. Each block is characterized by initial and final times, $[t_i, t_f]$, and the set of idle qubits.

3. Given the blocks structure, the total number of DD X gates can be calculated. Using this number together with X gates errors taken from the backend, the protocol may calculate an X-index. If this index is lower than a given threshold, the protocol keeps the block structure unchanged and skips step 4. Otherwise, the protocol moves to step 4.

4. The protocol divides the circuit to non-overlapping groups of maximum size four of connected qubits. The protocol then applies the block slicing described in 2 for each group separately to find a new block structure ("Local Blocks"). This method sacrifices ZZ correction on some links in order to dramatically reduce the total number of X gates. The grouping of the qubits is not necessarily unique and is optimized to reduce the number of X gates in the circuit and ZZ correction mismatches. Given a device topology and set of active qubits, the optimal grouping construction is fully automated.

5. Given the block structure (global or local) the protocol performs a set of block-merging rules to reduce the number of X gates. Our merging rules treat differently short blocks (under twice X gate duration), blocks of qubits with connectivity 1 and consecutive blocks with some similarity rules.

6. Given the final blocks structure, the protocol applies the optimal number of DD motifs (appropriate to the block duration) for all idle qubits in a block according to their group as determined in 1. Qubits are considered idle or driven only after their first participation in the circuit.

See FIG. 3 for an example of input and output circuits. The scheme is based on the fact that within each global block, the DD motif optimally reduces both $T_2$ and ZZ effects. Yet, in reality, since the gates in the circuits are not synchronized and have different durations, some blocks may be too short for implementing any DD or two short for implementing the full motif. Also, since X gates are not ideal, perfect embedding of the DD motif is not enough and DD schemes with an extreme load of X gates are likely to underperform. Steps 3 and 4, are aimed to find a compromise that optimizes the performance of a specific algorithm on a specific device.

The procedure above is hardware agnostic and completely automated. Given a compiled circuit, device topology and backend data, it returns the a circuit with the optimal DD embedded in it. This methods does not require pulse-level access. As long as the API of the quantum hardware accepts a timed schedule of gates, this method is applicable. The ideal δ-parameter and optimal number of motif application can be found in preliminary experiments which are automated as well.

Overview of Scalable Measurement Error Mitigation

An arbitrary quantum state is measured by projecting it on an observable. This task can be reduced to finding its probability distribution over all exponentially large set of basis states. The quantum circuit is executed multiple times to generate statistics required for constructing the probability distribution. The overall measurement error increases exponentially with the number of qubits due to compounding of readout errors from each individual qubit.

We can represent the error in readout assignment for a single qubit with a confusion matrix $(C_{1Q})$-

$$C_{1Q} = \begin{pmatrix} P[0|0] & P[0|1] \\ P[1|0] & P[1|1] \end{pmatrix}; \vec{P}_{meas} = C\vec{P}_{ideal}$$

where $C_{ij}=P[i|j]$ is the probability of assigning $|i\rangle$ to a measured state $|j\rangle$. For a single qubit, one can obtain the ideal distribution with inverse of the confusion matrix i.e. $\vec{P}_{ideal}=C^{-1}\vec{P}_{meas}$ and normalizing the quasi-probability distribution obtained. However, this method is prone to several scalability issues—

The size of the confusion matrix for the complete system $(2^{N_q} \times 2^{N_q})$ scales exponentially in the number of qubits $(N_q)$. For $N_q=42$, storing C in a sparse format requires 580PiB which is 120-times more than that available on Fugaku the currently fastest supercomputer.

Estimating the confusion matrix requires $2^{N_q}$ calibration experiments.

Since the measured distribution itself has $2^{N_q}$ different possible outcomes, sampling only M times with $M=2^{N_q}$ produces a poor estimation of the confusion matrix.

Inverting the confusion matrix for more than a handful of qubits is often ill-defined and is a time consuming process.

Automated Measurement Correction

Tensored Mitigation

Figure 4:
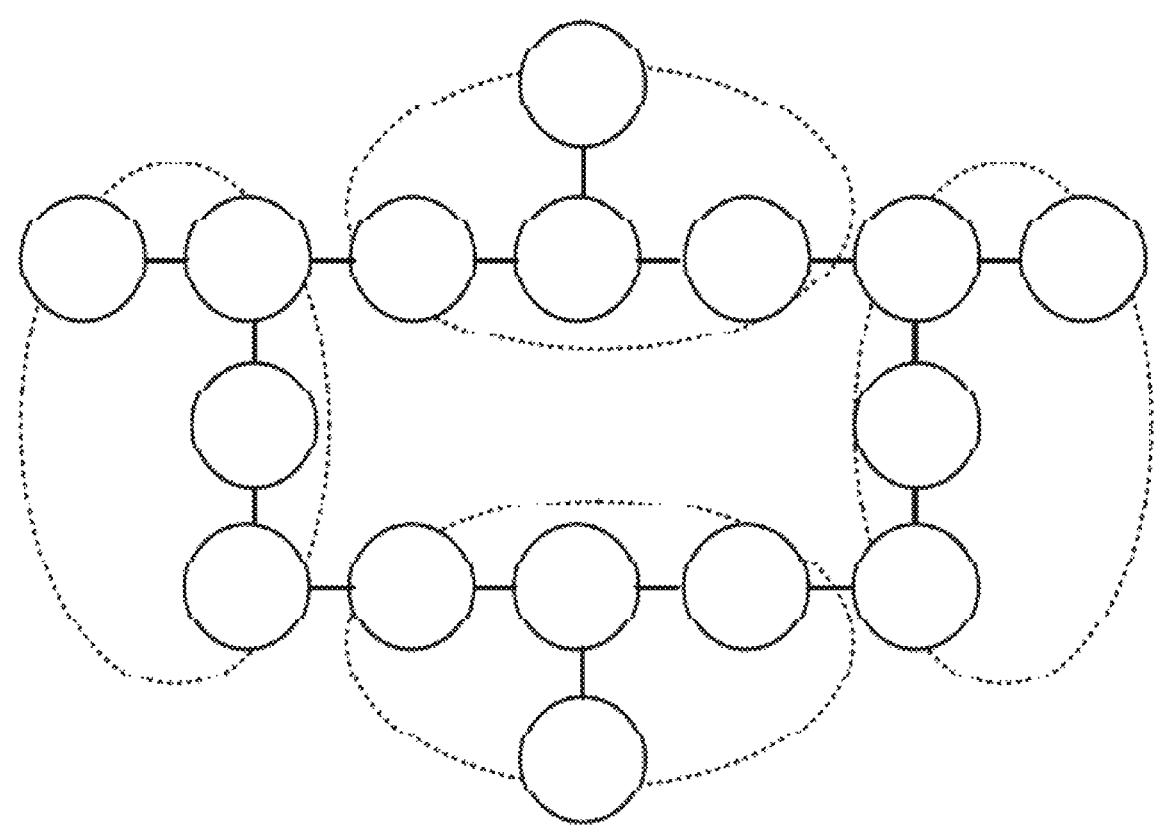
FIG. 4 illustrates an example of groups of four qubits each which minimizes inter-group correlations in the measurement readout.

The disclosed method addresses the above mentioned problems by dividing a quantum device into smaller groups of qubits which can then be efficiently corrected via tensor algebra. The groups are automatically chosen in a way that minimizes inter-group correlations among the measurements based on the topology of the given quantum computer. One such example of grouping is shown in FIG. 4.

The disclosed method ensures that the all the groups combined span the whole quantum computer (or at least all the measured qubits in a quantum circuit). Let $N_g$ be the number of groups and $\{G_i\}$ for $i \in \{k \in N : k \leq N_g\}$ denote the set of groups such that $$\bigcup_{i=1}^{N_g} G_i = [N_q].$$

The confusion matrices corresponding to each group in $\{G_i\}$ are $\{C_i\}$ and the size of each $C_i$ matrix is given by $2^{|G_i|} \times 2^{|G_i|}$.

The measured probability vector for $N_q$ qubits has $2^{N_q}$ elements corresponding to each bit string i.e. $P_i$ for $i=0, 1, \ldots, 2^{N_q}-1$ where $P_i$ denotes the probability of measuring the $N_q$-bit binary representation of i. The automated protocol is follows—

1. Reshape the measured probability vector of dimension $(2^{N_q} \times 1)$ into a tensor of dimensions $(2 \times 2 \times \ldots \times 2)$ such that each dimension i of the tensor corresponds to each qubit index i in the bit string.

2. Permute the qubit ordering in the tensor to correspond to the appropriate qubit orderings in $G_i$ 3. If all qubits are not measured, then add additional dimensions to the tensor for all the unmeasured qubits that are part of the same group $G_i$ as a measured qubit.

4. Reshape the permuted tensor into a tensor of dimensions $$\left(2^{|G_0|} \times 2^{|G_1|} \times \ldots \times 2^{|G_{N_g}|}\right).$$

Lets denote this reshaped tensor as $\tilde{P}$.

5. Contract each index of i the tensor $\tilde{P}$ with inverse of the appropriate confusion matrix $C_i$. Let $$a^i_{j,k}$$

be the elements of $$C_i^{-1}$$

and $$\tilde{P}^{mit}_{j_1,j_2,\dots,j_{N_g}} = \sum_{k_i \in [|G_i|]} a^1_{j_1,k_1} a^2_{j_2,k_2} \cdots a^{N_g}_{j_{N_g},k_{N_g}} \tilde{P}_{k_1,k_2,\dots,k_{N_g}} \qquad (1)$$

6. Reshape the tensor $\tilde{P}^{mit}$ to (2×2× . . . ×2) and remove any additionally added dimensions in step 3.
7. The output of step 6 can contain negative elements. Convert this quasi-probability distribution into the closest probability distribution.

The number of calibration experiments for this method is given by $$2^{\max_i(|G_i|)}.$$

In the example provided in FIG. 4, only 16 calibration experiments are needed to completely characterize a 16 qubit device as compared to 65536 calibration experiments needed for the complete confusion matrix approach. Moreover, since the disclosed method only estimates distributions over 16 states, the number of shots needed in order to achieve high accuracy is reduced dramatically. The requirement of inverting only small matrices provides additional speed and accuracy to the protocol execution.

Figure 5:
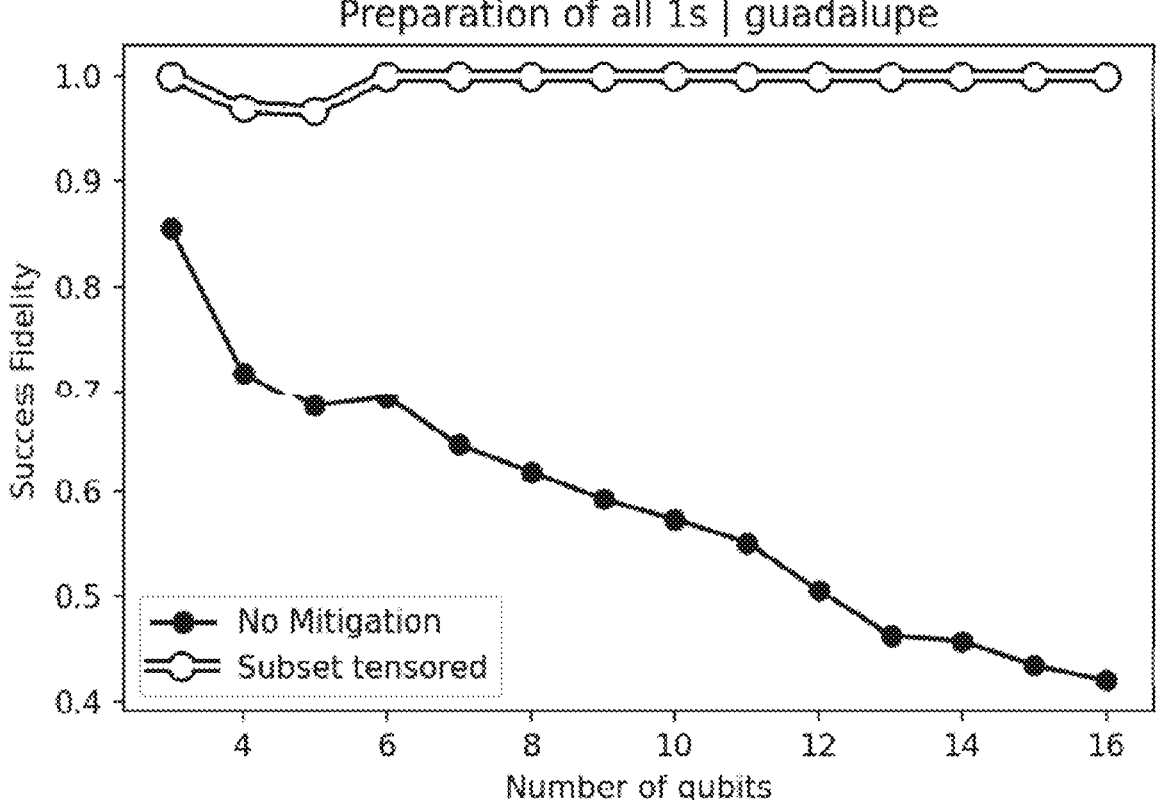
FIG. 5 illustrates the success probability of the disclosed methods. A certain number of qubits is prepared, as given by the x-axis, in the |1>state and measure the qubits. The plot illustrates the success probability of measuring the correct bit string. The shallow circuit-depth ensures that decoherence does not affect the success probability. Due to the readout error the success probability rapidly decreases with increasing number of qubits. However, the disclosed tensored mitigation protocol appropriately mitigates the readout error.

The effectiveness of the disclosed mitigation can be seen in FIG. 5. The disclosed formalism works directly with sparse distributions. This results in a scalable, fast and a competitively accurate protocol. Lastly, the method incorporates the small corrections from long-range/inter-group correlations by processing the output probability with a custom neural network as described below.

Neural Network (NN) for Multi-Qubit Correlations

Figure 6:
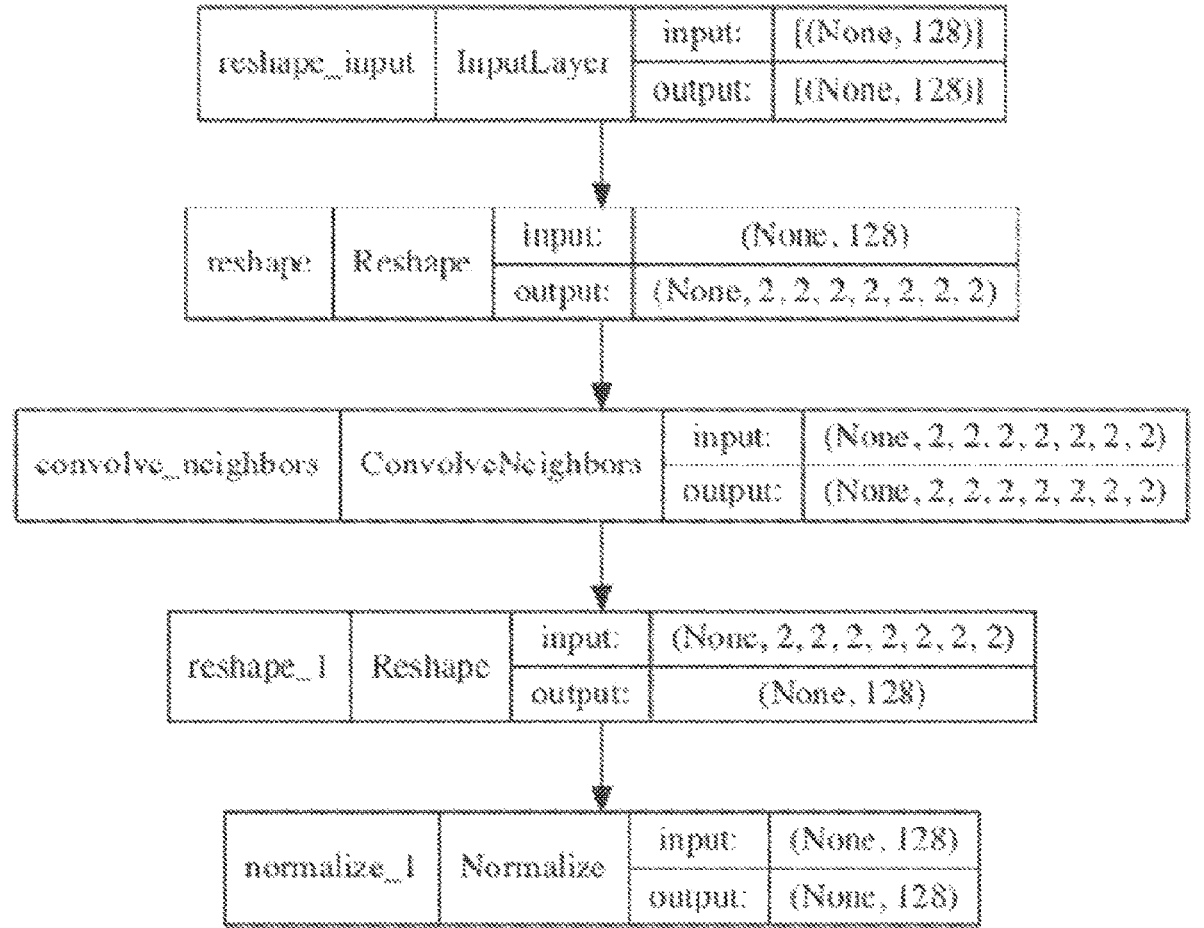
FIG. 6 illustrates an instance of the neural network architecture for measurement error correction on a 7 qubit quantum computer.

The disclosed method uses the output from tensored mitigation described above as an input to a neural network (NN). The goal of the NN is to restore correlations neglected (at the boundaries of the groups) earlier, account for non-linear effects and contextual errors that are not captures in the confusion matrix formalism. Since the method is looking for small modifications to the identity transformation, the method uses a ResNet-like architecture for the NN. The number of tuneable parameters in the NN scales sub-linearly with the number of qubits ($N_q$). This approach minimizes the amount of training data required. An example of the neural network for 7 qubits is shown in FIG. 6

Figure 7:
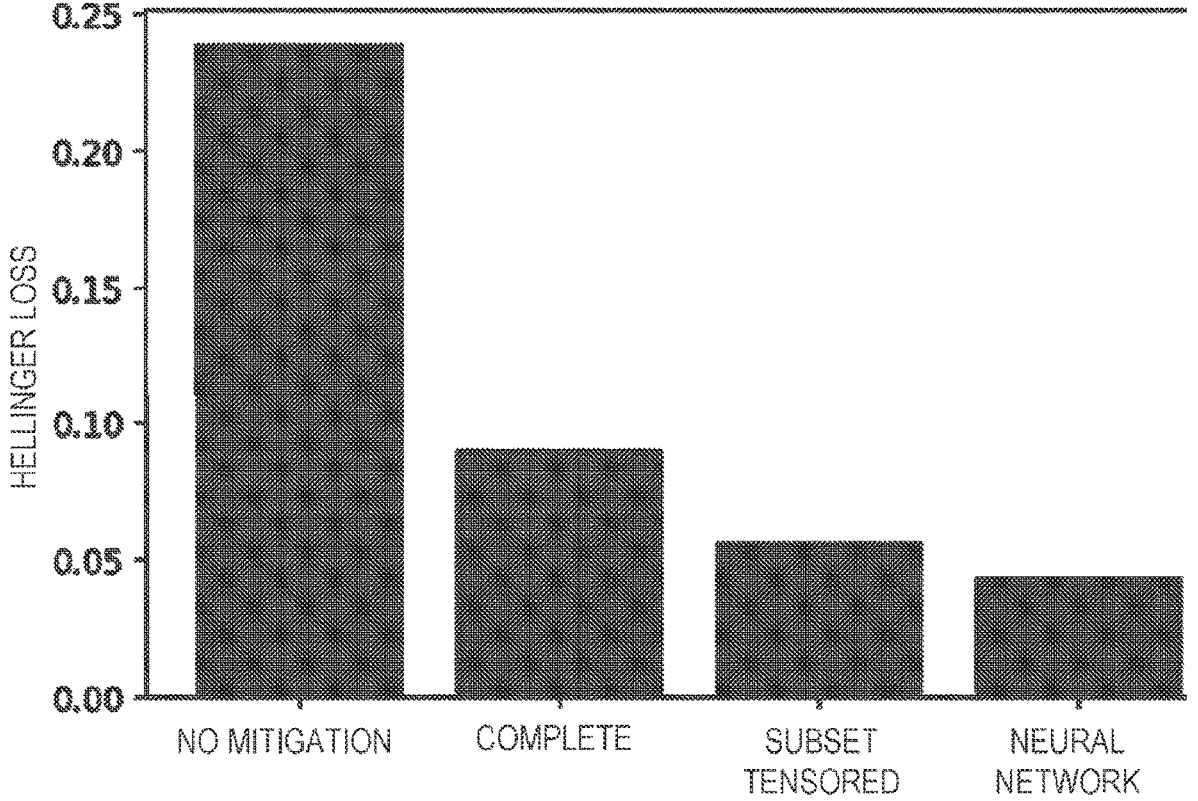
FIG. 7 illustrates a comparison of measurement error, denoted by the Hellinger loss, averaged over 2000 random probability distributions on a 7 qubit quantum computer.

Disclosed herein is an automated approach to incorporate both the disclosed tensored mitigation methods and the disclosed neural network approach seamlessly. FIG. 7 shows that the neural network provides additional improvements in addition to that provided by the subset tensored mitigation protocol. Moreover, the trained network continues to provide improvement at least up to 15 days without additional training data. The disclosed methods are also applicable for mitigating error in the expectation of an observable.

Quantum Compilation

Quantum compilers are used for finding more efficient ways to execute programs on quantum devices. A quantum compiler uses a sequence of "compiler passes" to handle the mapping of the circuit to the device gate-set and topology, and the simplification of the circuit instructions. This includes passes that: remove unnecessary gates, reduce circuit depth, and move gates onto qubits with lower error rates. Simplifying the logic of the circuit is a first step in mitigating the impact of noise during program execution—fewer operations gives fewer opportunities for error or can remove certain error-prone operations or qubits from the circuit.

To compile the circuit optimally, however, a delicate balance between these compiler passes is found. For example, moving single-qubit gates onto qubits with low error-rates requires the insertion of SWAP operations into the circuit. These SWAP gates increase circuit depth due to being made up of two-qubit gates (e.g., CNOT, CZ), those of which are also typically more prone to ZZ errors. So, while some error coming from the single-qubit gates are mitigated, new sources of error with two-qubit gates are introduced. It is these diminishing returns between each compiler pass that can be weighed for any given algorithm and device.

Cross-Talk Aware Compilation

As highlighted above, finding the correct sequence of compiler passes is non-trivial and depends on both the device and the algorithm. There exist several open-source quantum compilers that can be used as a foundation to automate this procedure. By writing custom plug-ins to TKET (https://github.com/CQCL/tket) and qiskit (https://qiskit.org/), it is possible to tailor the compiler flow based on error-characteristics of the device. The "vanilla" procedure works as follows:

1. Run an initial "gate pass" to map the circuit to the device gates.
2. Use a specified "topology pass" to map the circuit to the device topology.

This may involve the insertion of SWAP-gates into the circuit.

3. Use a specified "routing pass" to place the circuit in a desirable format.

This will include moving circuit instructions onto qubits with lower gate errors. It may also involve the insertion of SWAP-gates.

4. Run a "SWAP-reduction pass" that iteratively minimizes the number of SWAP gates in the circuit.
5. Run another gate pass.
6. Run a specified sequence of isomorphic reductions ("simplification passes") on the circuit. This may include the removal of redundant gates, minimization of two-qubit operations, and replacement of certain gate sequences with simpler known definitions.
7. Use a "two-qubit-gate rerouting pass" to avoid running certain gates in parallel.
8. Run a final gate pass and topology pass before returning the circuit.

While this vanilla approach has moderate success in general, certain algorithms may require a more tailored approach to maximize error-mitigation. Important to this are the topology, routing, and simplification passes that are run on the circuit.

In particular, the behavior of the topology and routing passes largely depend on circuit characteristics such as the depth, density, and amount of two-qubit gates. One undesirable outcome of these passes are the insertion of an excess of SWAP gates. For N SWAP gates, 3N two-qubit gates are required to implement them. Too much rerouting from the original circuit placement can easily become detrimental to performance. Additionally, the behavior of the simplification passes is largely dependent on the format of the circuit. While two circuits may be isomorphic, differences in their gate operations may lead to different simplifications being made.

To alleviate this, disclosed herein is a hybrid compilation routine that alternates between different topology, routing, and simplification passes. More specifically, the disclosed method compiles the initial circuit using three different procedures:

1. Run the vanilla approach using topology pass A, routing pass A, and simplification pass sequence A ("routine A").
2. Run the vanilla approach using topology pass B, routing pass B, and simplification pass sequence B ("routine B").
3. Run the vanilla approach "M" times sequentially, passing the output of routine A into routine B and back until convergence ("hybrid routine").
4. If necessary, avoid specific gates in parallel.

With the hybrid approach, the disclosed method is alternating between two different sets of passes that, on their own, may only be moderately effective. By running them back and forth, however, the disclosed method is effectively exposing them to different initial conditions (topology, format, and gates) every time. This enables the disclosed method to extract as much benefit as possible from each pass. The last step is performed in cases of strong cross talk where the application of two gates simultaneously has a much lower quality than the conservative individual implementation of the two gates.

Figure 8A:
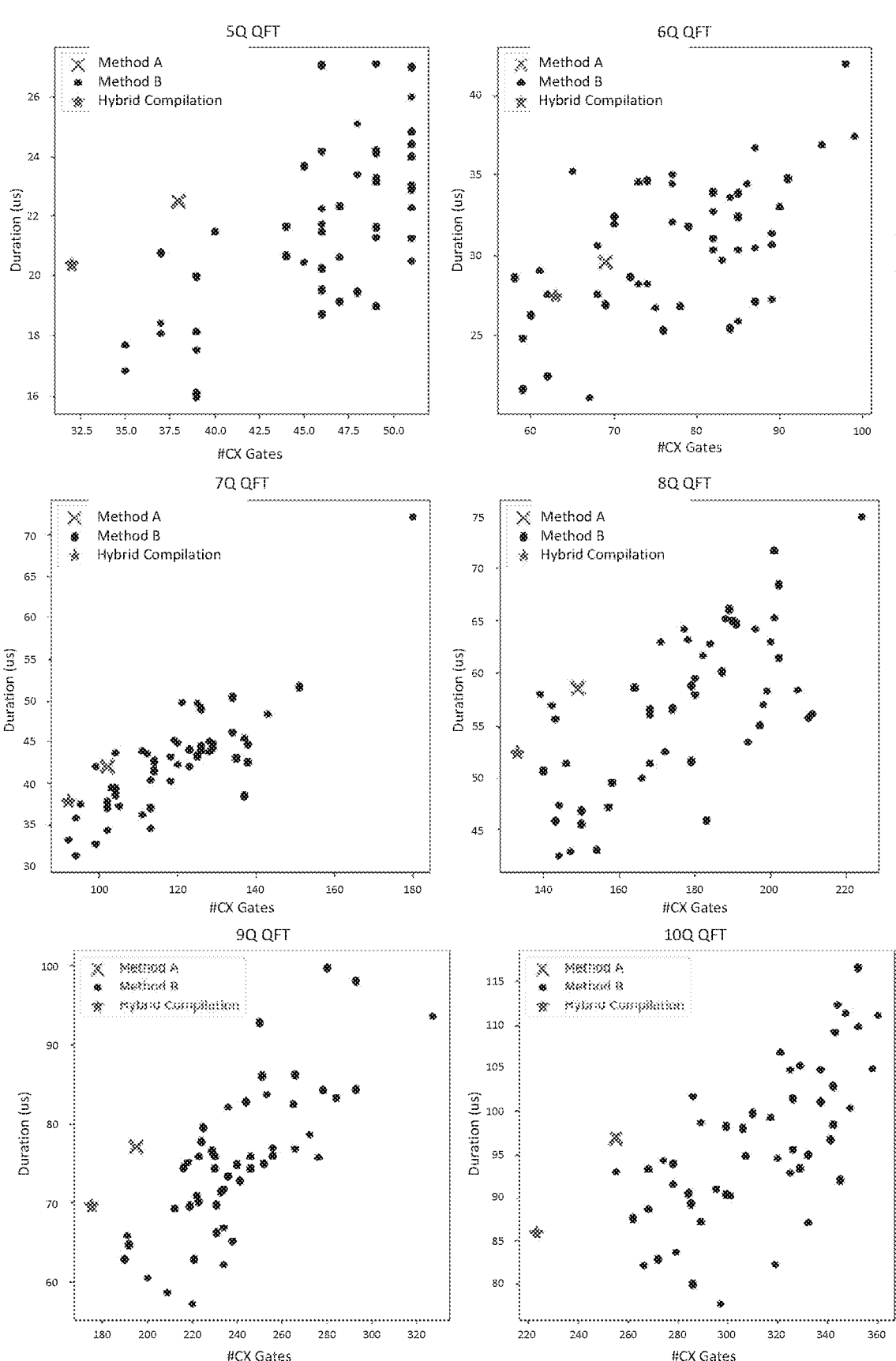
FIGS. 8a and 8b compare the different compilation methods using QFT circuits. Method A is a stochastic method, therefore, the figures present 50 instances of the method. The total number of CX gates and the total circuit duration are used as comparison features. As seen, the hybrid method typically find shorter circuits with lower number of entangling gates. While this plot does not demonstrate it, the hybrid method better avoids low quality qubits. In the case above, Q3 has higher SPAM and CX errors than device average. The hybrid method avoid this qubit completely for circuits with less than 11 qubits. As a comparison, for the 10 qubits QFT, 70% of the circuits method A produced contain the problematic qubit.
Figure 8B:
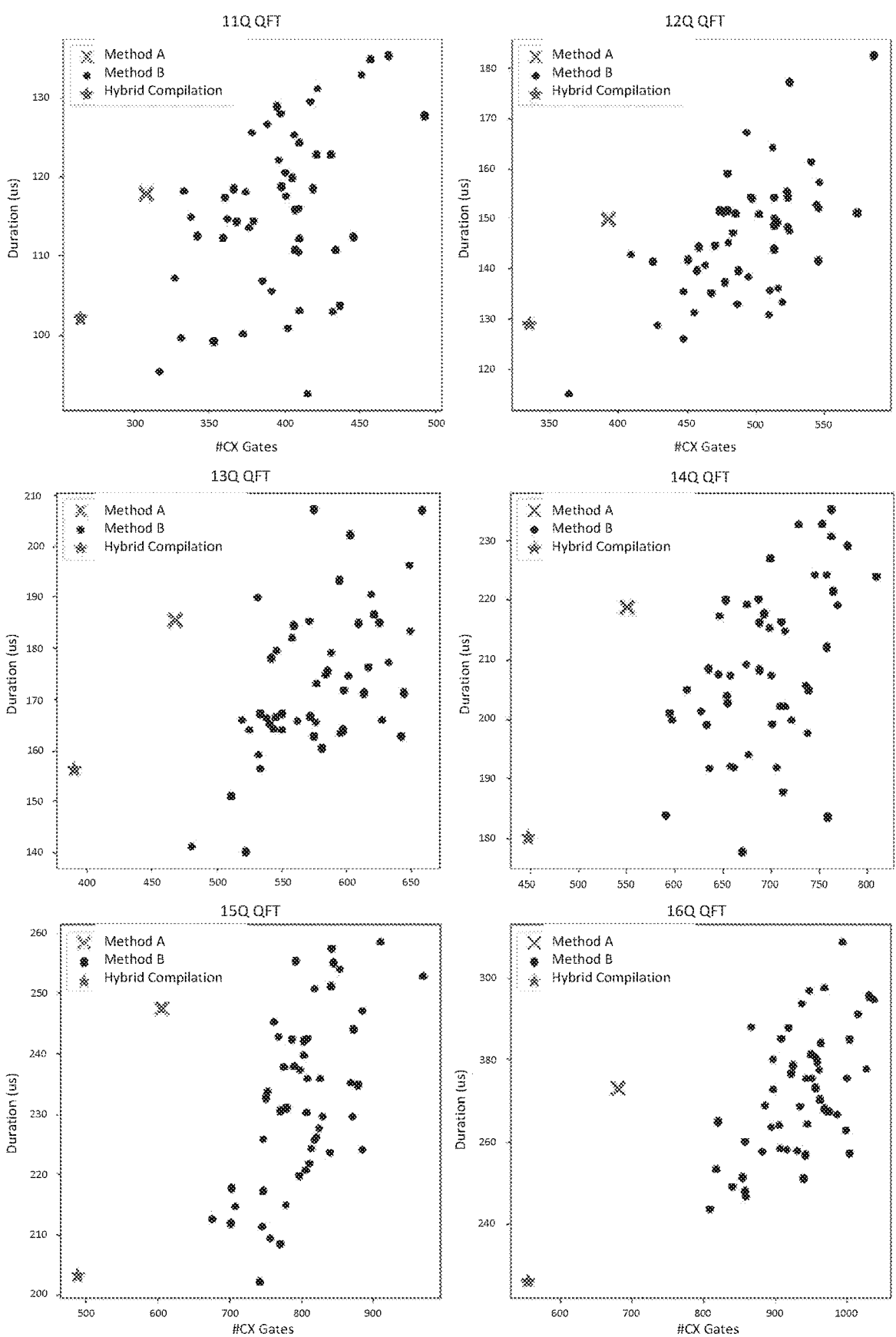

Once the disclosed method has run all three of these routines, the method selects the "best" using a heuristic based on the number of two-qubit operations in each circuit. This approach enables the selection of the optimally compiled circuit each time, regardless of the algorithm and device. A comparison of the three different routines is provided in FIG. 8 for QFT. The chosen circuit is ultimately embedded with the DD motif outlined above using a custom set of "decoupling passes".

Automated Full Device Gate Optimization and Calibration

Quantum gates are the building blocks of any quantum circuit. Continuously maintaining a high quality (low error) basis gate set is a challenge all hardware providers are facing. Reducing gate errors can be achieved by manipulating a set of accessible experimental control probes. The exact details depend on the specifics of the hardware.

The disclosed method is able to provide low level implementations of quantum gates based only on measured system responses without requiring any prior knowledge of the particular device model or its underlying error processes.

This black box optimization protocol is based on a set of repeated experiments where the disclosed method extracts the gate error from an error-amplification protocol. One such protocol fits the estimated mean infidelity vs. the number of gate repetitions N. For each value of N the method applies $N_{batch}$ different implementations of the gate under test N times on two or more different initial states. For example, the method evaluates the quality of a specific CX gate implementation by applying it on the initial states $|{+}0\rangle$ and $|{+}1\rangle$.

After each run, a full state tomography is performed and an estimation of infidelity with respect to the ideal target state is calculated. An effective measure of error-per-gate is extracted by applying a linear fit to the average infidelity as a function of N, which provides a measure of the gate error in the low error limit.

The above procedure constitutes a cost function which assigns a quality measure to specific gate implementations. It is not the only approach to determining the error, and may incorporate measurement routines such as randomized benchmarking, gateset tomography, or the like to construct the cost function. The automated optimization procedures are designed to interact with the system in order to produce better and better gate implementations. More details can be found in Y. Baum, M. Amico, S. Howell, M. Hush, M. Liuzzi, P. Mundada, T. Merkh, A. R. Carvalho, and M. J. Biercuk, Experimental deep reinforcement learning for error robust gate-set design on a superconducting quantum computer, PRX Quantum 2, 040324 (2021). In particular, the method uses a form of optimization such as deep reinforcement learning to design a universal set of error-robust quantum logic gates in runtime, without requiring knowledge of a specific Hamiltonian model of the system, its controls, or its underlying error processes. More specifically, the method applies closed-loop control techniques such as autonomous deep-reinforcement-learning to discover the best control signals drive state evolution through iterative interaction with a quantum computer; this delivers new waveforms defining a universal gate set that outperforms human-designed solutions. Because the control design process involves direct hardware measurements, all error sources—including leakage, dephasing, crosstalk, rf signal miscalibrations and distortions—are captured in the optimized control, even if they are known to a human operator.

Figure 9:
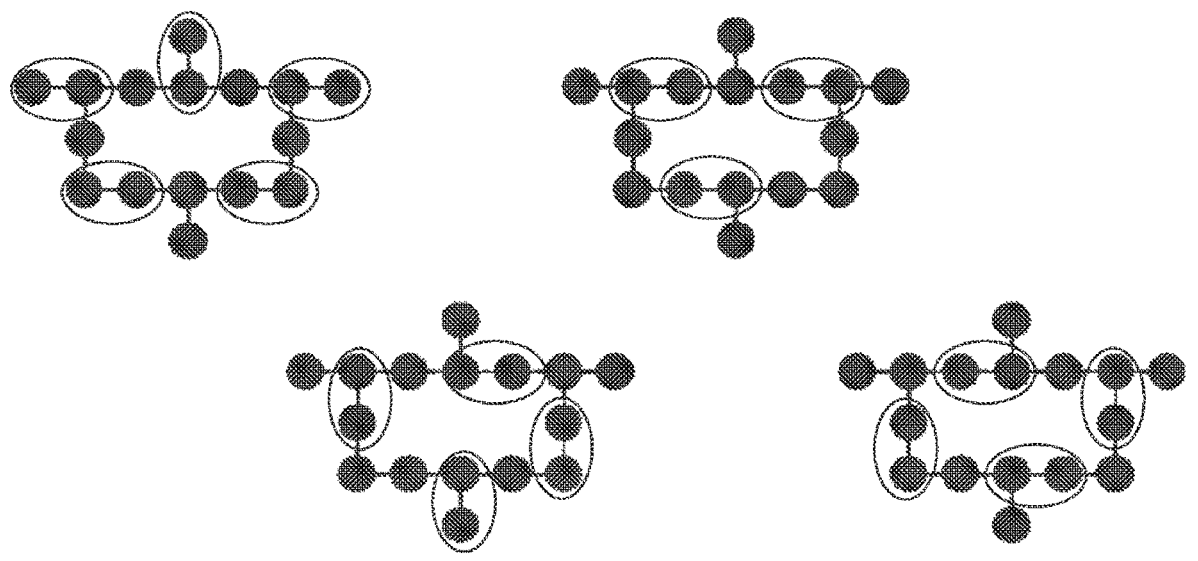
FIG. 9 illustrates dividing a quantum circuit so that full device calibration can be done in parallel requiring a fixed number of steps depending on the device connectivity. Heavy-hex topology can be tuned up in only four steps irrespective of the device size.

The procedure above applies to a pair of qubits. In general, different pairs that do not share a qubit can be optimized in parallel. If strong cross talk effects exist, it may be beneficial to avoid a parallel optimization of neighboring pairs. The method automatically splits the device to a set of qubit pairs that can be optimized in parallel. Such splitting is depicted in FIG. 9 where due to strong cross talk effects the sixteen pairs are divided to four groups. This is an example grouping based on the example device's connectivity. The gates between the pairs in each group are optimized in parallel.

Additional characterization routines may be run to learn about device error sources and noise processes in order to inform—either directly or indirectly, the gate optimization routine. This may include noise characterization or Hamiltonian parameter estimation processes useful in informing the definition of the cost function for optimization.

Summary of Overall Advantages

Figure 10:
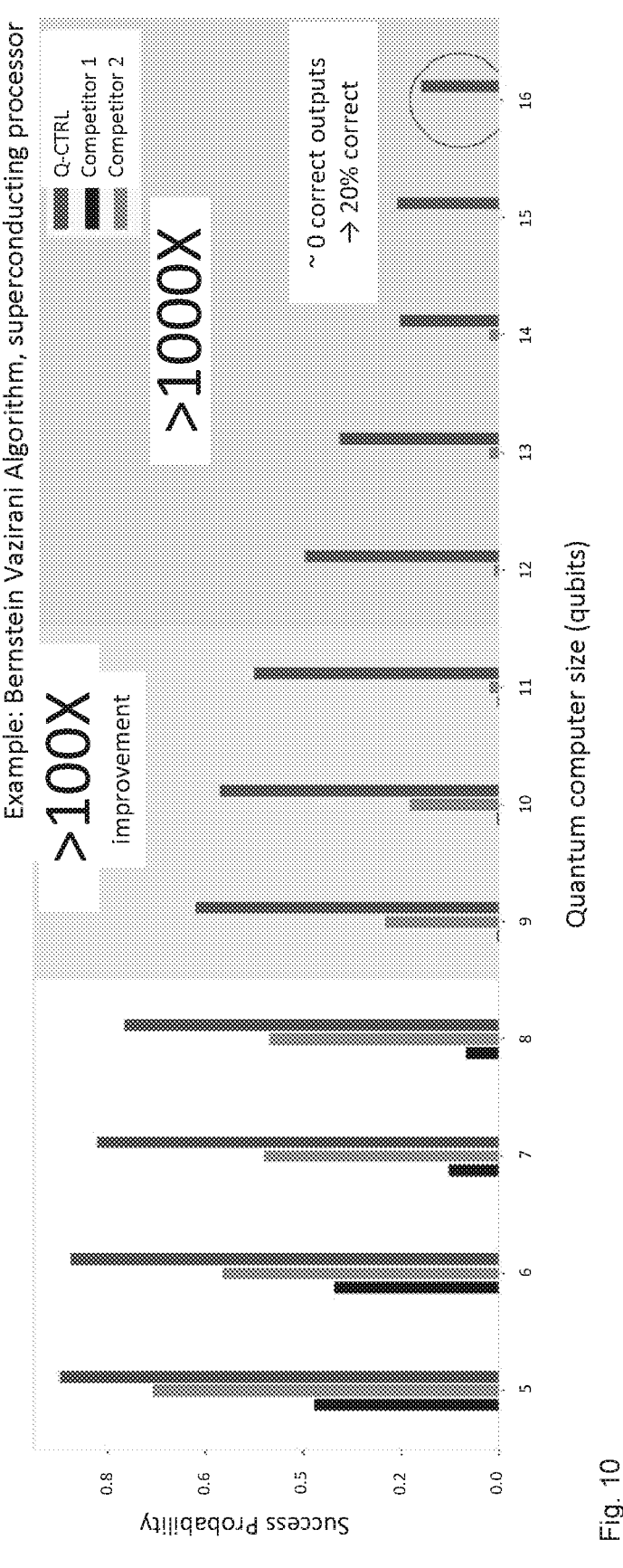
FIG. 10 illustrates success probability of a Bernstein-Vazirani algorithm on a 16 qubits device. The black data corresponds to the best compilation available by the hardware provider, the grey data has similar compilation as the black data together with the newest DD scheme and measurement error mitigation available by the hardware provider. The purple data shows the performance using the software tools in this document.

The disclosed methods, implemented as a software package, are agnostic to the hardware and to the type of algorithm. Given an arbitrary algorithm and hardware properties, such as device topology, connectivity and backend data on qubits quality, the disclosed method enhances the performance of the algorithm by employing the methods disclosed herein. Other preliminary experiments can be added automatically, such as cross talk analysis or noise spectroscopy, in order to achieve further performance enhancement. The methods include optimized system aware compilation, optimal DD embedding, full device gate calibration/optimization and scalable measurement error mitigation. FIG. 10 compares the success probability of a Bernstein-Vazirani algorithm on a 16 qubits device. In the comparison, we compare our automated software tools to best compilation, DD scheme and measurement error mitigation available by the hardware provider.

Method for Generating an Error-Corrected Quantum Circuit

FIG. 11 illustrates a method 1100 for generating an error-corrected quantum circuit. Method 1100 comprises compiling 1101 a quantum algorithm onto a quantum hardware using multiple qubits to generate a quantum circuit. As discussed above, this involves mapping the quantum algorithm onto the native gate set of the quantum hardware and replacing the native gates with error corrected gates using previous characterisation measurements.

The method 1100 then comprises determining 1102 a quantum relationship (e.g. coupling) between the multiple qubits, and a quantum relationship (e.g. coupling) between the multiple qubits and an external environment as a result of implementing the quantum circuit on the quantum hardware. This may involve determining pairs of gates that show cross-talk between them, for example. This may also involve measurements to characterise the error that is expected to occur as a result of the interaction with the environment. This quantum relationship can lead to an error that is specific for a given quantum hardware and is specific to the quantum circuit as generated by the compilation step because the compilation defines which gates are close to each other and the actions being applied to neighboring qubits, leading to potential crosstalk. Further details have been described above.

Method 110 then comprises using 1103 the quantum relationship between the multiple qubits and between the multiple qubits and an external environment to determine a deterministic error correction protocol for each of the multiple qubits and for interactions between the multiple qubits. For example, as explained with reference to FIGS. 1 and 2, the deterministic error correction includes identity gates and a time shift to optimise the correction of ZZ errors as well as optimized error-robust quantum gates on qubit pairs and individual qubits.

Method for Characterising Errors

FIG. 12 illustrates a method 1200 for characterising errors in quantum hardware comprising multiple qubits. This may be seen as a more detailed version of step 1102 in FIG. 11. Method 1200 provides measured system responses without requiring any prior knowledge of the particular device model or its underlying processes. That is, method 1200 is part of a black box optimization method where the actual quantum hardware is treated as a black box with minimal knowledge about how the quantum hardware is built.

Method 1200 comprises determining 1201 groups of qubits to minimize inter-group correlations based on a topology of the quantum hardware and then performing 1202 multiple measurements to approximate a confusion matrix for individual qubit readouts. Method 1200 comprises repeating the multiple measurements for the qubit groups to determine the error characterisation of the hardware. In some examples, e procedure above applies to a pair of qubits. In general, different pairs that do not share a qubit can be optimized in parallel as shown in FIG. 9.

Method for Compiling

FIG. 13 illustrates a method 1300 for compiling a quantum algorithm onto a quantum hardware having a native gate set. Method 1300 comprises repeatedly performing the steps of performing 1301 a first compilation process to map the quantum algorithm onto the quantum hardware and the native gate set and using 1302 the output of the first compilation process as an input for performing a second compilation process, different from the first compilation process, to maximize the use of low-error qubits as identified by an error characterisation process as explained above with reference to FIGS. 8*a* and 8*b*.

Method for Quantum Error Correction

Figure 14:
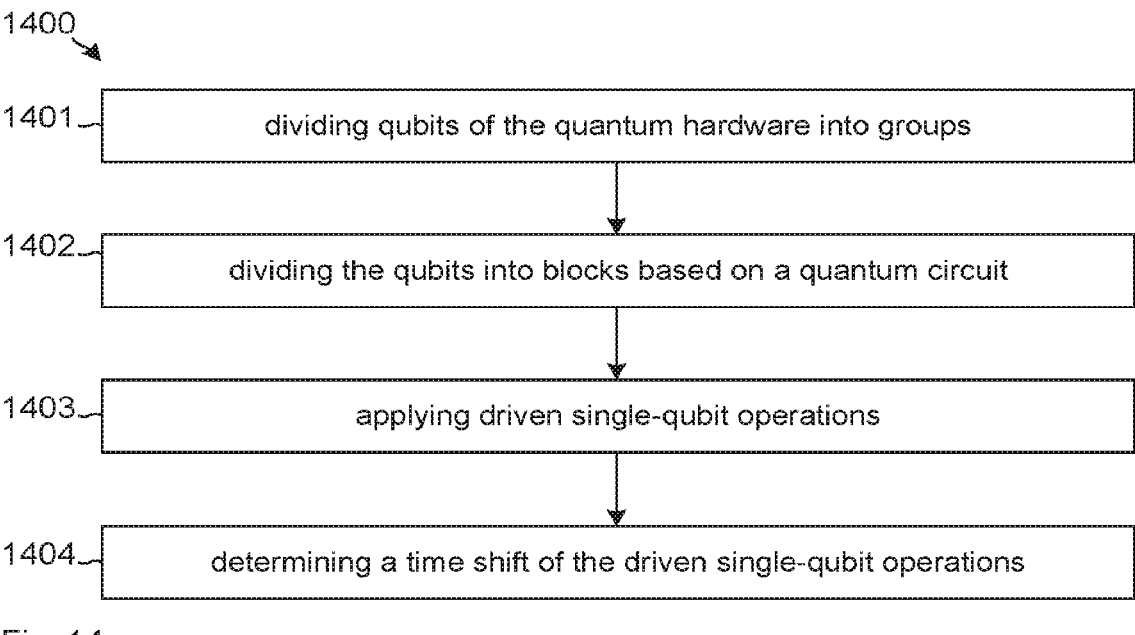
FIG. 14 illustrates a method for quantum error correction of a quantum hardware.

FIG. 14 illustrates a method 1400 for quantum error correction of a quantum hardware as explained above with reference to DD motifs. Method 1400 comprises dividing 1401 qubits of the quantum hardware into groups based on a topology of the quantum hardware. Method 1400 then comprises dividing 1402 the qubits into blocks based on a quantum circuit compiled onto the quantum hardware. Method 1400 further comprises applying 1403 driven single-qubit operations to correct quantum errors arising during identity operations dependent on the quantum circuit compiled onto the quantum hardware. Finally, method 1400 comprises determining 1404 a time shift of the driven single-qubit operations to correct cross coupling for each of the groups during identity operations and the blocks and suppress decoherence as explained with reference to FIGS. 1 and 2.

Additional error correction may be achieved using error-robust optimized gates using methods previously described. More specifically, there is provided a method for gate-set optimisation for a quantum hardware. The method comprises performing measurements on the quantum hardware to determine a quality measure to gate implementations on the quantum hardware. The method then comprises applying an optimisation procedure to iteratively adjust gate characteristics and repeat the measurements to progress towards a reduced error in the quantum gates. The gate characteristics may involve waveforms to control qubits in the quantum hardware. The method may further comprise performing the optimisation procedure to define a universal gate set. Further, the measurements are representative of multiple error sources, such as leakage, dephasing, crosstalk, rf signal miscalibrations and distortions. Even further, the measurements and optimisation procedure can be applied to the quantum hardware without knowledge of the details of the quantum hardware, such as the actual Hamiltonians of the physical apparatus.

Method for Error-Correcting Compilation

Figure 15:
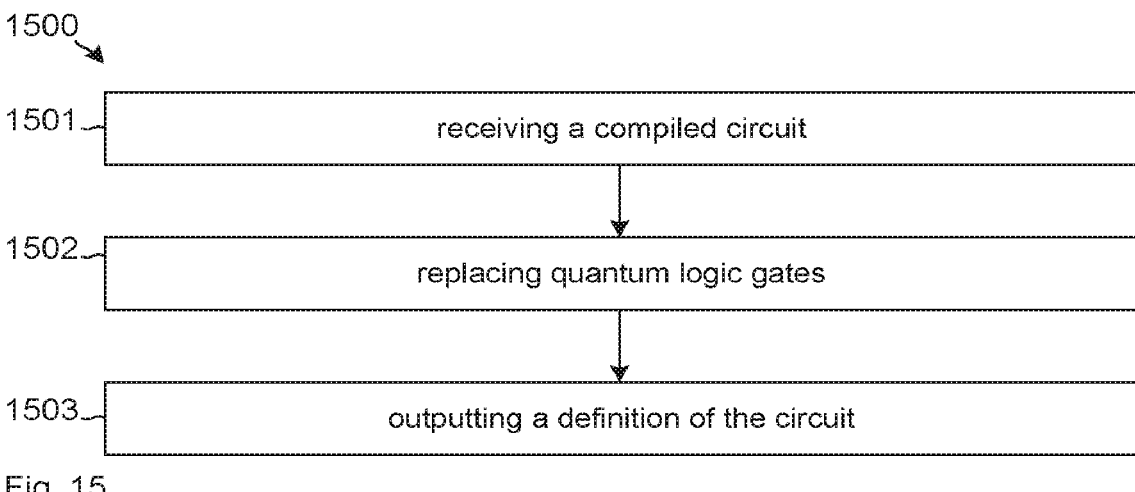
FIG. 15 illustrates a method for error-correcting compilation.

FIG. 15 illustrates a method 1500 for error-correcting compilation to correct error sources identified in an error characterisation process. The method comprises receiving 1501 a compiled circuit compatible with an error characterisation and hardware device topology and gate set and replacing 1502 quantum logic gates in the compiled circuit having uncorrected errors over an acceptable threshold with error-corrected alternatives, derived using the error characterisation process. Finally, method 1500 comprises outputting 1503 a definition of the circuit with all replacement gate definitions in a format for hardware execution, including identity and non-identity operations.

Method for Correcting Errors in Quantum Measurements

Figure 16:
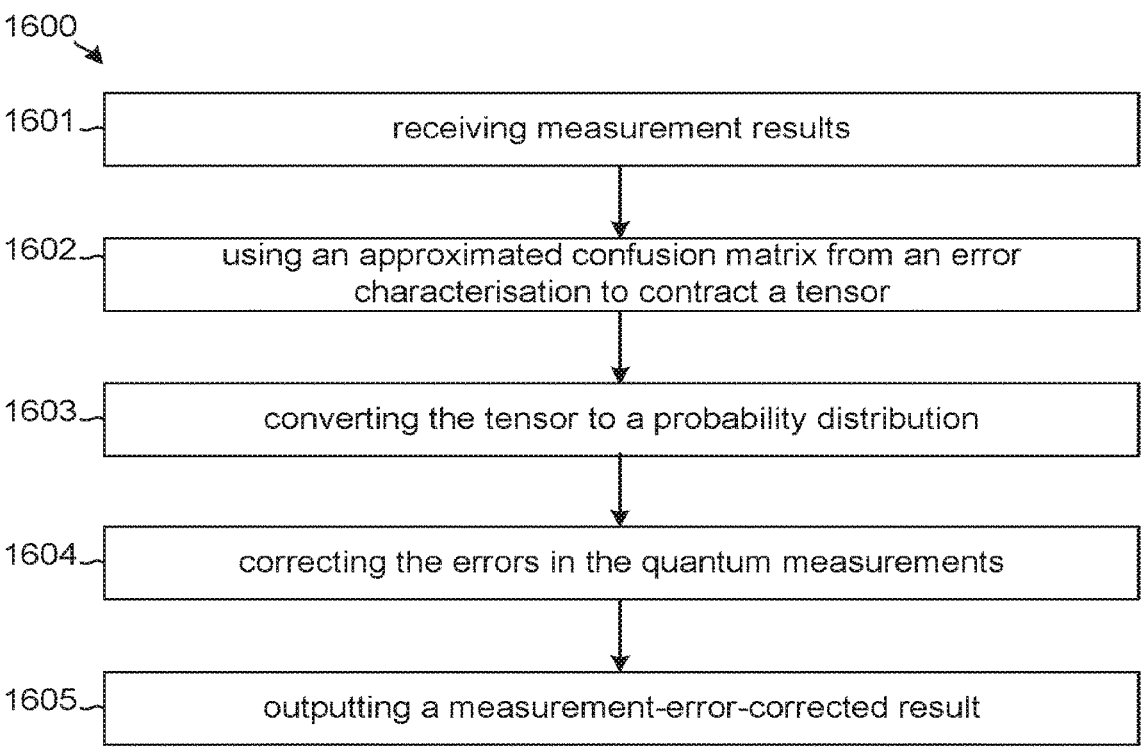
FIG. 16 illustrates a method for correcting errors in quantum measurements

FIG. 16 illustrates a method 1600 for correcting errors in quantum measurements of a quantum circuit on a quantum hardware. Method 1600 comprises receiving measurement results 1601 and using 1602 an approximated confusion matrix from an error characterisation to contract a tensor based on the groups of qubits. Method 1600 then comprises converting 1603 the tensor to a probability distribution and correcting 1604 the errors in the quantum measurements as indicated by the probability distribution. Finally, method 1600 comprises outputting 1605 a measurement-error-corrected result.

Internet Server

Figure 17:
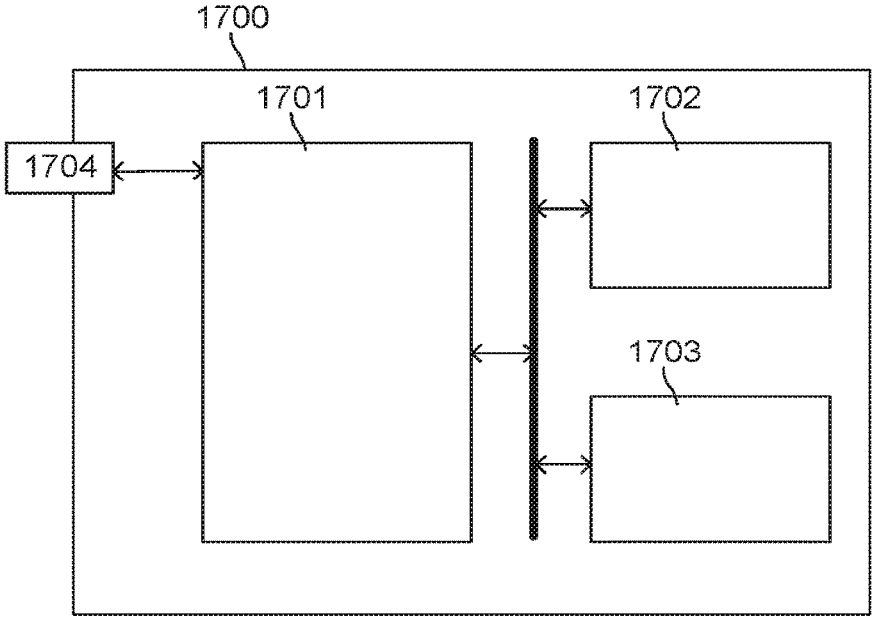
FIG. 17 illustrates an internet server.

FIG. 17 illustrates an internet server 1700, which is a computer system that is connected to the internet to receive and send data over the internet to various other computer systems. In particular, internet server 1700 is connected, via the internet, to a user client computer and an interface computer of a quantum hardware. Internet server 1700 is a classical, digital electronic computer system and comprises a processor 1701, program memory 1702, data memory 1703 and a communication port 1704.

Program memory 1702 is a non-volatile computer-readable medium and has program code stored thereon that, when executed by processor 1701, causes the processor to perform the methods disclosed herein, including methods disclosed in FIGS. 11-16.

Internet server 1700 is configured, by way of program code installed on program memory 1702, to offer, or expose, a web-interface. The web interface comprises input elements to input a quantum algorithm and a characterisation of a quantum hardware. The web-interface may be a graphical user interface with graphical input elements for data entry or file upload, or may be an application programming interface (API) with syntactical input elements, such as XML or JSON fields.

Internet server 1700 is therefore configured to receive the quantum algorithm and an incomplete description of the quantum hardware through the web-interface. The quantum algorithm and the incomplete description may be provided by the same user, by different users or the incomplete description may be provided by the vendor or provider of the quantum hardware. The description is considered "incomplete" because it includes an abstract description of the quantum hardware (such as native gate set) but does not include an error characterisation of the individual gates or circuit blocks.

Therefore, internet server 1700 is further configured to perform error characterisation or retrieve an error characterisation previously performed, such as from data memory 1703, for the target quantum hardware. Error characterisation may involve communication with the quantum hardware to initiate qubits with quantum values, perform quantum operations and receive measurements to characterise the error as described above.

Internet server 1700 is further configured to generate a decorated quantum circuit description that realises the quantum algorithm on the quantum hardware. "Decorated" in this context means that the quantum circuit comprises quantum gates as well as control protocols for error correction. Further, the decorated quantum circuit description comprises quantum logic blocks that are error corrected based on the error characterisation as described above as gate calibration.

Internet server 1700 is further configured to output the quantum circuit description. This may be to the user so that the user can send the description to the quantum hardware for implementation. In other examples, the internet server 1700 sends the description directly to the quantum hardware, such as an API of the hardware provider for immediate implementation.

Once the quantum algorithm is performed on the quantum hardware, internet server 1700 receives and analyses the raw output data from the quantum hardware using the complete characterisation. This involves the measurement error correction described above.

As a result of the methods disclosed herein, deterministic error correction protocols are applied to the quantum hardware and error corrected gates are used together with measurement error correction. Together, these measures lead to a significant reduction in error rates, which was previously not achievable.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for quantum error correction of a quantum hardware, the method comprising:
   dividing qubits of the quantum hardware into groups based on a topology of the quantum hardware;
   dividing the qubits into blocks based on a quantum circuit compiled onto the quantum hardware;
   applying driven single-qubit operations to correct quantum errors arising during identity operations dependent on the quantum circuit compiled onto the quantum hardware; and
   determining a time shift of the driven single-qubit operations to correct cross coupling for each of the groups during identity operations and the blocks and suppress decoherence.

2. The method of claim 1, further comprising redefining non-identity operations to correct for error processes identified through error characterization through time-domain modulation of control signals used to implement the non-identity operations.

3. The method of claim 1, further comprising modulating control signals in multiple qubits in time in a continuous or discontinuous manner.

4. The method of claim 1, further comprising assembling the blocks from a library of error-corrected quantum gates based on an error characterization.

5. The method of claim 1, further comprising:
   receiving a compiled circuit compatible with a hardware device topology and a gate set;
   replacing quantum logic gates in the compiled circuit having uncorrected errors over an acceptable threshold with error-corrected alternatives, derived using an error characterization process; and
   outputting a definition of the circuit with all replacement gate definitions in a format for hardware execution, including identity and non-identity operations.

6. The method of claim 5, further comprising:
   identifying error-prone non-identity gates;
   replacing error-prone non-identity gates with auto-calibrated gates;
   replacing identity gates in the compiled quantum circuit with error-corrected identity gates including an error correction protocol; and
   assembling an output error-robust circuit comprising the auto-calibrated gates and the error-corrected identity gates into a circuit representation for execution on the quantum hardware.

7. The method of claim 1, further comprising:
   compiling a quantum algorithm onto the quantum hardware using multiple qubits to generate a quantum circuit;
   determining a quantum relationship between the multiple qubits and between the multiple qubits and an external environment as a result of implementing the quantum circuit on the quantum hardware; and
   using the quantum relationship between the multiple qubits and between the multiple qubits and an external environment to determine a deterministic error correction protocol for each of the multiple qubits and for interactions between the multiple qubits.

8. The method of claim 7, further comprising performing multiple measurements on qubits of the quantum hardware to determine an error characterization of the quantum hardware based on a topology of the quantum hardware, the error characterization comprising one or more of individual gate errors, decoherence processes, measurement errors, and cross-talk between qubits based on the topology of the quantum hardware.

9. The method of claim 7, wherein compiling comprises, for each of multiple logical quantum operations in the quantum algorithm, selecting one or more quantum blocks to realize the logical quantum operation on the quantum hardware, wherein each of the selected quantum blocks realizes the logical function of that logical quantum operation.

10. The method of claim 7, further comprising determining an error correction protocol for each of the quantum blocks, the error correction protocol comprising error correction against errors identified in an error characterization and being specific for selected one or more quantum blocks to realize the quantum algorithm.

11. The method of claim 7, further comprising:

executing the quantum algorithm on the quantum hardware using selected quantum blocks and the deterministic error correction protocol to obtain qubit measurements; and reducing measurement errors in the qubit measurements by applying an error reduction operation that is based on an error characterization.

12. The method of claim 1, further comprising:

determining groups of the qubits to minimize inter-group correlations based on a topology of the quantum hardware;

performing multiple measurements to approximate a confusion matrix for individual qubit readouts; and repeating the multiple measurements for the qubit groups to determine an error characterization of the hardware.

13. The method of claim 12, wherein the groups of qubits includes qubit pairs with low cross-coupling between pairs.

14. The method of claim 12, wherein the error characterization comprises one or more of individual gate fidelities, noise spectra, and crosstalk strengths.

15. The method of claim 12, wherein the method further comprises using machine learning to automate the determining of the error characterization.

16. The method of claim 12, wherein the method further comprises optimizing parameters of quantum gates using the qubits to maximise fidelity of the quantum gates.

17. The method of claim 16, wherein fidelity is maximized for gates with qubits in the groups in parallel.

18. The method of claim 1, further comprising:

performing a first compilation process to map a quantum algorithm onto the quantum hardware and the gate set; and using an output of the first compilation process as an input for performing a second compilation process, different from the first compilation process, to maximize the use of low-error qubits as identified by an error characterization process.

* * * * *